United States Patent [19]

Uchiyama et al.

[11] Patent Number: 4,813,989
[45] Date of Patent: Mar. 21, 1989

[54] APPARATUS FOR FABRICATING OPTICAL FIBER PREFORM

[75] Inventors: Nobuhito Uchiyama; Tamotsu Kamiya; Yasuhiro Shibayama, all of Ichihara; Shigeo Takagi, Chiba; Sakae Katano, Ichihara, all of Japan

[73] Assignee: The Furukawa Electroic Co., Ltd., Tokyo, Japan

[21] Appl. No.: 871,279

[22] Filed: Jun. 6, 1986

[30] Foreign Application Priority Data

Jun. 21, 1985 [JP] Japan ................................ 60-135461

[51] Int. Cl.⁴ ..................... C03B 37/018; C03B 37/07
[52] U.S. Cl. .......................................... 65/1; 65/3.12; 65/144; 65/160; 65/161
[58] Field of Search ................... 65/3.12, 3.2, 18.2, 65/29, 144, 160, 161, 1

[56] References Cited

U.S. PATENT DOCUMENTS

| | | | |
|---|---|---|---|
| 4,280,829 | 7/1981 | Sheth | 65/3.12 |
| 4,385,915 | 5/1983 | Amelse et al. | 65/3.12 |
| 4,389,229 | 6/1983 | Jang et al. | 655/3.12 |
| 4,578,253 | 3/1986 | Gill et al. | 65/3.12 |

FOREIGN PATENT DOCUMENTS 60-137840 7/1985 Japan .
58243360 7/1985 Japan .

OTHER PUBLICATIONS

W. L. McCabe et al., "Unit Operations of Chemical Engineering", Fourth Edition, pp. 183–191.

Primary Examiner—Kenneth M. Schor
Attorney, Agent, or Firm—Foley & Lardner, Schwartz, Jeffery, Schwaab, Mack, Blumenthal & Evans

[57] ABSTRACT

An apparatus for fabricating an optical fiber preform having a support for rotatably holding a reaction tube, a raw material supply unit for supplying a glass raw material from one end of the reaction tube to the interior of the reaction tube and a heater for heating the reaction tube by reciprocating in the axial direction of the reaction tube which comprises a pressure measuring unit at the other end of the reaction tube, a gas pressure control chamber having a gas inlet and an exhaust port, and a blower capable of controlling the introduced gas pressure according to the measured value of the pressure memasuring unit in the gas inlet. Thus, the apparatus can accurately control the internal pressure of a reaction tube in good responsiveness.

3 Claims, 1 Drawing Sheet

APPARATUS FOR FABRICATING OPTICAL FIBER PREFORM

BACKGROUND OF THE INVENTION

This invention relates to an apparatus for fabricating an optical fiber preform of a modified CVD type.

An MCVD method has been heretofore used an apparatus for fabricating an optical fiber preform. This method the steps of supplying a glass raw material into a rotating reaction tube, heating the raw material by a heater such as a torch reciprocating in the axial direction of the reaction tube, and accumulating the raw material in the reaction tube to form a desired refractive index distribution.

The conventional MCVD method has the following drawbacks. When the reaction tube made of quartz tube is heated and softened by the heater, it gradually contracts due to the own surface tension, with the result that a uniform glass accumulation layer having desired thickness cannot be formed on the inner surface of the reaction tube, and the reaction tube is deformed due to the softening with the result that the longitudinal section of the reaction tube becomes irregular.

In order to solve the above described drawbacks, a method of increasing the internal pressure of the reaction tube higher than the external pressure while accumulating the glass layer in the reaction tube has been proposed. More specifically, as disclosed in Japanese Patent Publication No. 37536/1982, a method of feeding back the outer diameter value of the reaction tube to the internal pressure regulator provided at the other end of the reaction tube to regulate the internal pressure of the reaction tube has been proposed. However, according to this method, since the flow rate of the supplied glass raw material and the sequentially varying internal pressure in the reaction tube by the inner diameter of the reaction tube are controlled by indirect values such as the outer diameter of the reaction tube, they cannot be accurately controlled. Further, the outer diameter of the reaction tube is likely to vary in the longitudinal direction, and the selection of the measuring point becomes difficult.

The inventor of the present invention has proposed in Japanese Patent Application No. 243360/1983 an improvement of the abovementioned conventional method. The improved method provides a pressure measuring unit, an exhaust port, a gas pressure control chamber having a gas inlet at the other end of the reaction tube, and an exhaust gas flow regulating valve in the exhaust port, so as to control the opening and closing degree of the valve according to the value of the pressure measuring unit. This method has the advantage that the internal pressure of the reaction tube can be measured directly so that one can accurately regulate the pressure as compared with the previous conventional method. However, since the pressure is regulated only by opening and closing the regulating valve, improved method still has the drawback that its responsiveness is deteriorated.

SUMMARY OF THE INVENTION

Accordingly, an object of this invention is to provide an apparatus for fabricating an optical fiber preform which can accurately control the internal pressure of a reaction tube with good responsiveness.

In order to achieve the above and other objects of this invention, there is provided an apparatus for fabricating an optical fiber preform which has a support for rotatably holding a reaction tube, a raw material supply unit for supplying a glass raw material from one end of the reaction tube to the interior of the reaction tube, a heater for heating the reaction tube by reciprocating in the axial direction of the reaction tube, a pressure measuring unit at the other end of the reaction tube, a gas pressure control chamber havng a gas inlet and an exhaust port, and a blower capable of controlling the introduced gas pressure according to the measured value of the pressure measuring unit in the gas inlet.

The above and other related objects and features of the invention will be apparent from a reading of the following description of the disclosure found in the accompanying drawings and the novelty thereof pointed out in the appended claims.

DESCRIPTION OF THE PREFERRED EMBODIMENTS

Embodiments of an apparatus for fabricating an optical fiber preform of the present invention will be described in detail with reference to the accompanying drawings.

Figure 1:
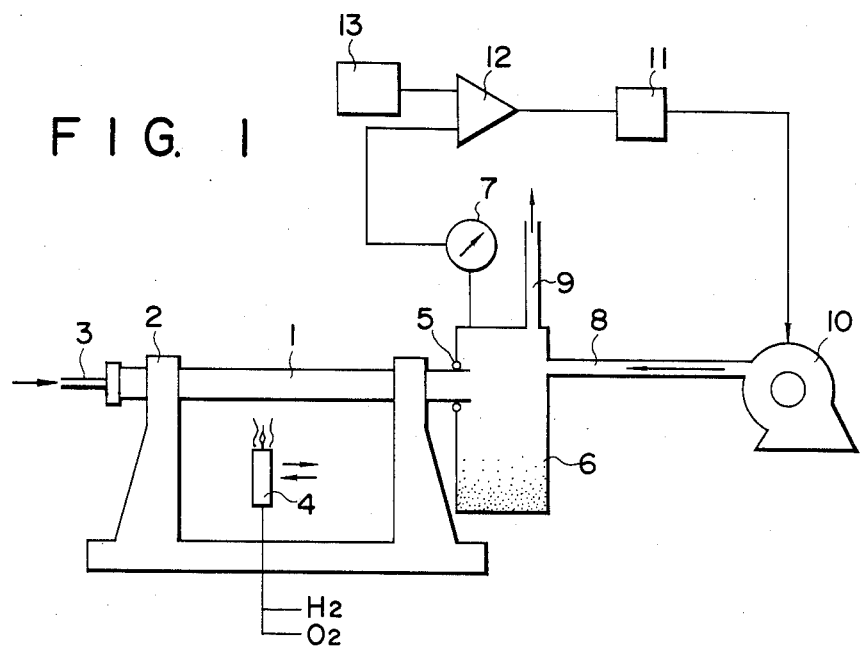
FIG. 1 is a schematic view of an embodiment of an apparatus for fabricating an optical fiber preform according to the present invention.

FIG. 1 shows an embodiment of an apparatus for fabricating an optical fiber preform of the invention. As shown in FIG. 1, this invention relates to an apparatus for fabricating an optical fiber preform having a support 2 for rotatably holding a reaction tube 1 made of a quartz glass, a raw material supply unit, not shown, for supplying glass raw material made, for example, of silicon tetrachloride and germanium tetrachloride supplied together with oxygen from one end of the reaction tube 1 to the interior of the reaction tube (reference numeral 3 designates a supply port for supplying the glass raw material from the supply unit), and a heater 4 such as a torch for heating the reaction tube 1 by reciprocating in the axial direction of the reaction tube 1. The apparatus further comprises a pressure measuring unit 7 at the other end of the reaction tube 1, a gas inlet 8, a gas pressure control chamber 6 having an exhaust port 9, and a blower 10 for controlling the gas flow introduced by the measured value of the measuring unit 7 to the inlet 8 to control the introduced gas pressure. The blower 10 is preferably of a rotating speed control type capable of regulating the gas flow to be introduced by the rotating speed so as to preferably control more accurately the introduced gas pressure. A calculator 12 with a setter 13 and a drive unit 11 for driving the blower 10 are provided as a control system between the blower 10 and the measuring unit 7 to control the introduced gas pressure fed through the inlet 8 by controlling the rotating speed of the blower 10 according to the differential pressure between the setter 13 and the measuring unit 7.

Figure 2:
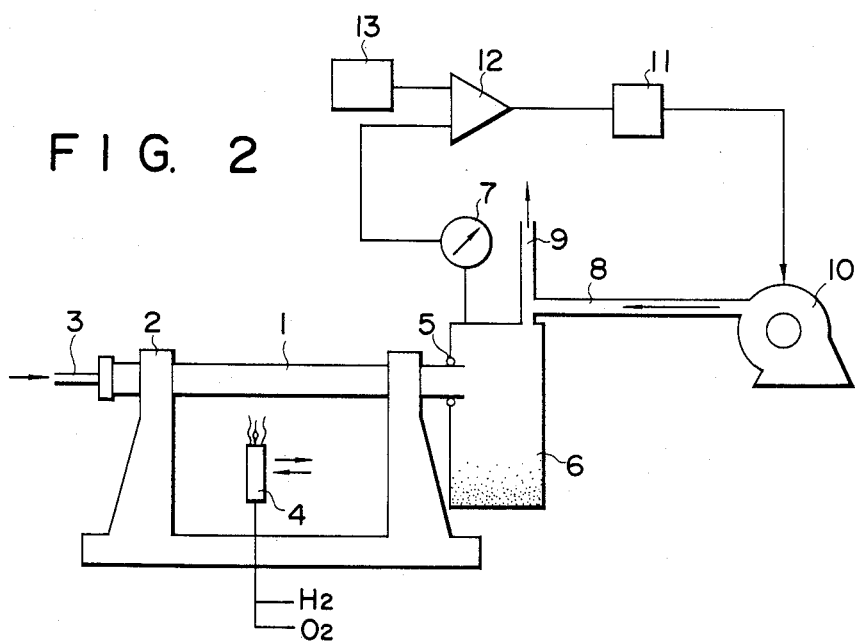
FIG. 2 is a schematic view of another embodiment of the apparatus of the invention.

The gas pressure control chamber 6 has, as shown in FIG. 1, the function of collecting dust of fine glass particles which have not adhered the reaction tube 1. When the chamber 6 is small, there is a possibility that the fine glass particles collected will be blown upward by the gas introduced by the blower 10. In this case, as shown in FIG. 2, the gas inlet 8 may be connected to the midsection of the exhaust port 9. Thus, it can prevent the fine glass particles from adhering the exhaust port 9.

An example of the apparatus for fabricating the optical fiber preform has the following configuration.

The reaction tube 1 uses a quartz tube having 26 mm of outer diameter and 22 mm of inner diameter to form 90 of glass accumulation layers in the reaction tube 1. At this time, the setter 13 sets approx. 10 mmH₂O higher than the atmospheric pressure to regulate the internal pressure in the reaction tube 1 while controlling the rotating speed of the blower 10 to be proportional to the differential pressure between the set pressure and the measured value of the measuring unit 7. As a result, the axial variation in the final outer diameter of the reaction tube 1 formed with 90 of glass accumulation layers is ±0.1 mm or less to obtain remarkably preferable optical fiber preform. On the contrary, the variation according to the control method by opening and closing the regulating valve as disclosed in Japanese Patent Application No. 243 360/1983 described above causes a local variation to be ±0.7 mm.

According to the apparatus for fabricating the optical fiber preform of the present invention, the pressure in the reaction tube 1 can be directly measured, the value is fed back to the blower 10, the gas flow rate supplied by the rotating speed can be regulated, and the blower 10 accurately controlling the introduced gas pressure is used, thereby accurately controlling the internal pressure of the reaction tube 1. Since the gas is forcibly introduced by the blower 10, the apparatus has excellent responsiveness.

According to the present invention as described above, in case of fabricating the optical fiber preform by the MCVD method, the apparatus for fabricating the optical fiber preform excellent to control the pressure of the reaction tube can be provided to obtain the excellent optical fiber preform having no variation in the outer diameter.

What is claimed is:

1. An apparatus for fabricating an optical fiber preform comprising:
    a support for rotatably holding a reaction tube;
    a raw material supply unit for supplying a glass-forming raw material from a first end of the reaction tube to the interior of the reaction tube;
    a heater for heating the reaction tube by reciprocating in the axial direction of the reaction tube;
    a pressure measuring unit operatively connected at a second end of the reaction tube;
    a gas pressure control chamber communicating with the second end of the reaction tube and having a gas inlet and an exhaust port;
    a variable speed rotating blower for controlling gas pressure introduced in the gas pressure control chamber in response to a measured value of the pressure measuring unit said blower being in fluid flow communication with said measure control chambers; and
    means including a setter for controlling the rotating speed of the blower in response to a differential pressure between the setter and the measuring unit to provide a greater internal pressure in the reaction tube than the external pressure on the reaction tube.

2. An apparatus as claimed in claim 1 wherein the means for controlling the rotating speed of the blower comprises a control system having a calculator connected to the setter and a drive unit for driving the blower.

3. An apparatus as claimed in claim 1 comprising means for introducing gas pressure into the exhaust port of the gas pressure control chamber.

* * * * *